Figure 1:
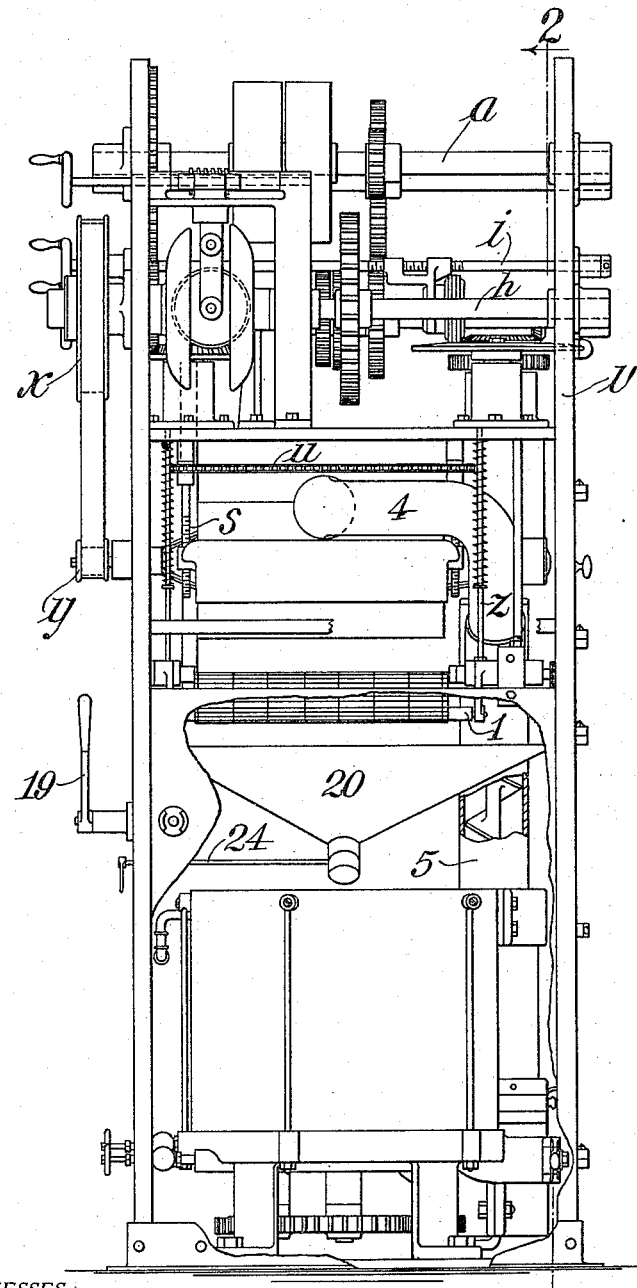

A. L. BAUSMAN.
COATING MACHINE.
APPLICATION FILED DEC. 10, 1913.

1,160,991.

Patented Nov. 16, 1915.
5 SHEETS—SHEET 1.

WITNESSES:
H. E. Hartwell
Caroline W. Willis

INVENTOR.
Alonzo L. Bausman.
BY
Chapin &Co.
ATTORNEYS

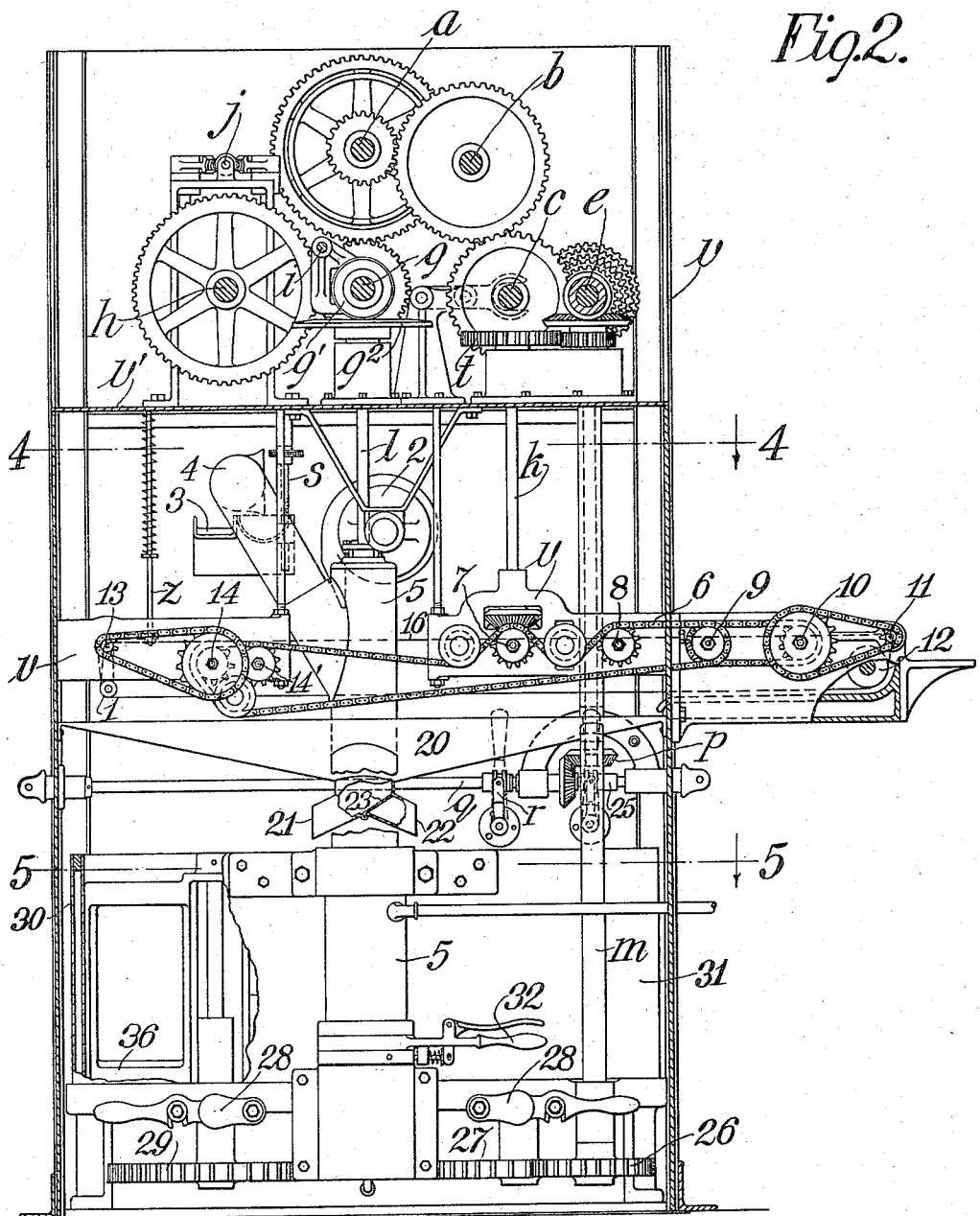

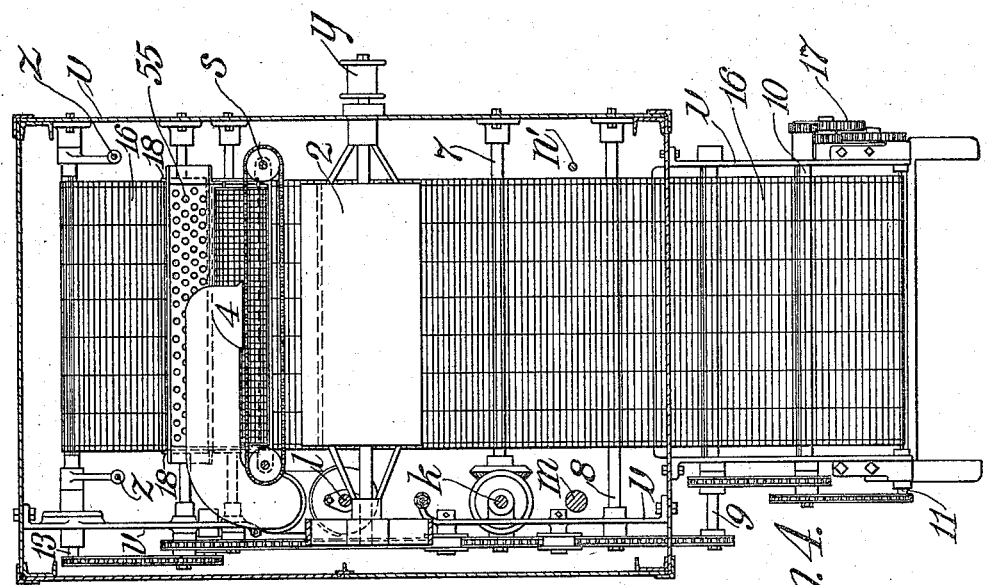

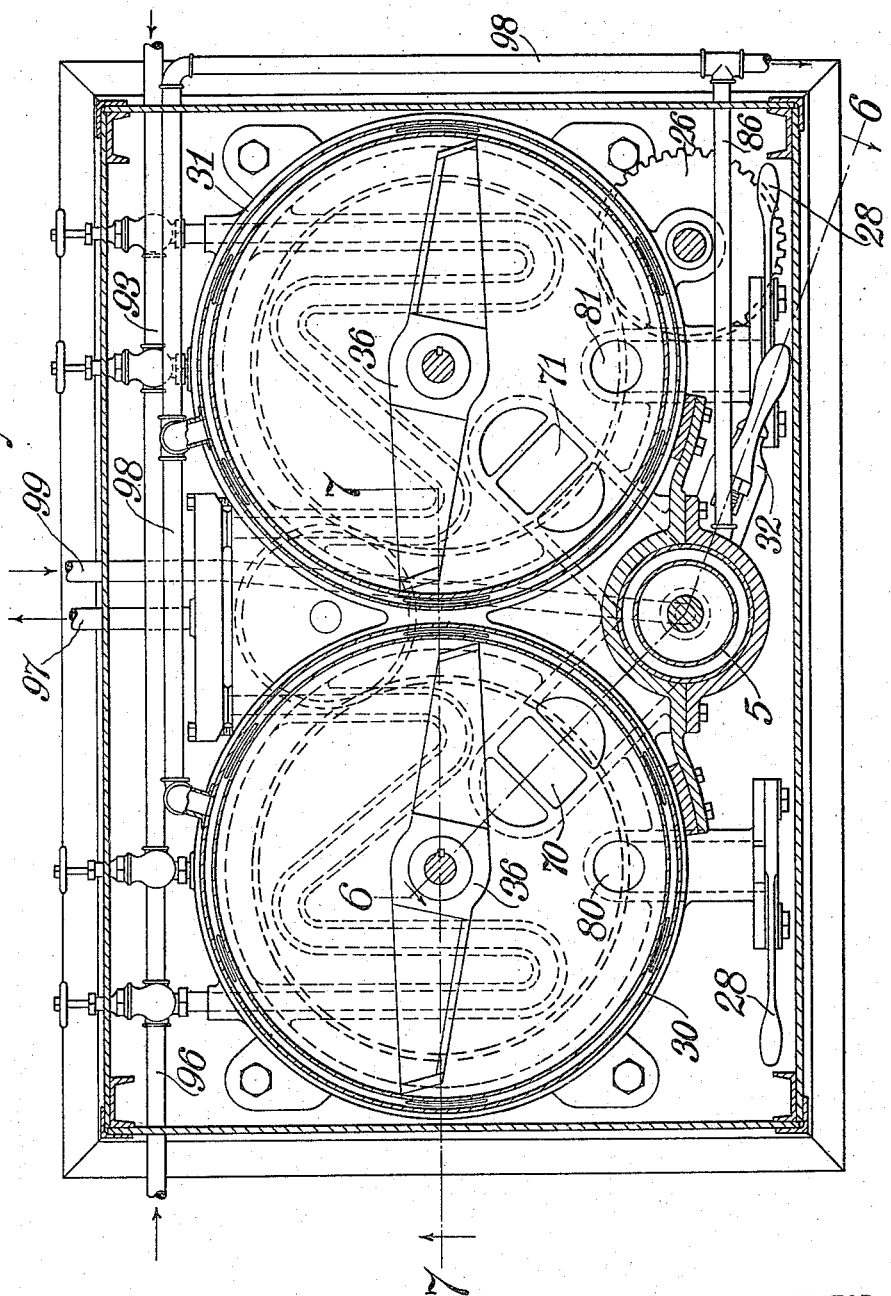

A. L. BAUSMAN.
COATING MACHINE.
APPLICATION FILED DEC. 10, 1913.
1,160,991.
Patented Nov. 16, 1915.
5 SHEETS—SHEET 5.
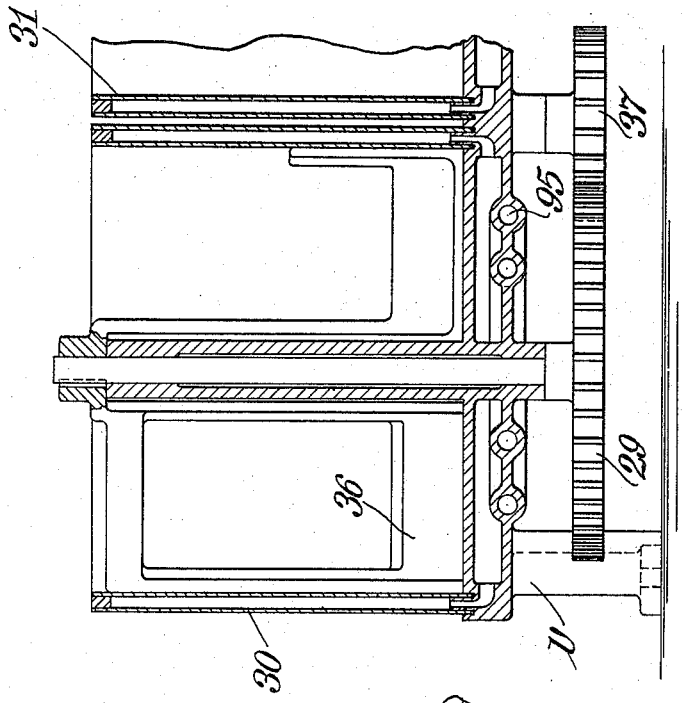
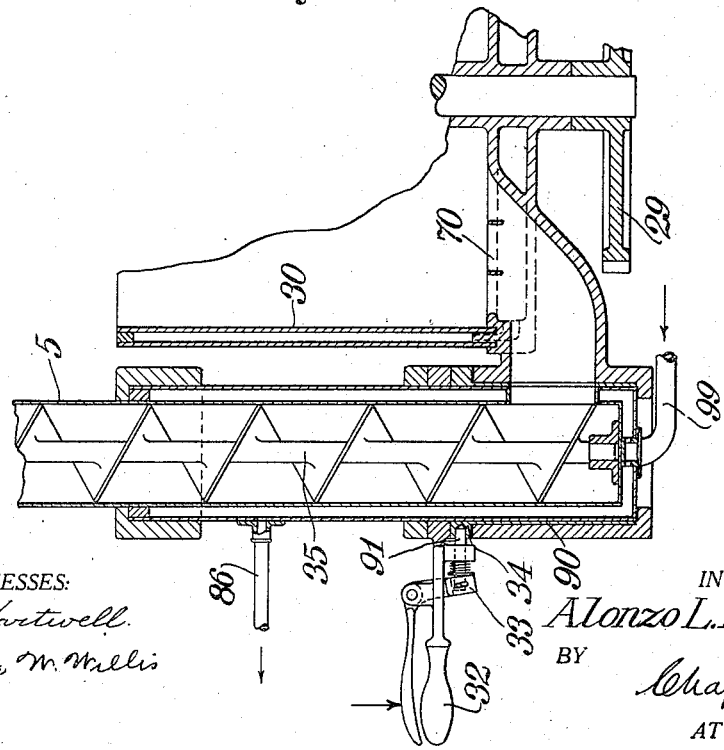
WITNESSES:
F. E. Hartwell.
Caroline M. Willis
INVENTOR.
Alonzo L. Bausman.
BY
Chapin & Co.
ATTORNEYS

UNITED STATES PATENT OFFICE.

ALONZO LINTON BAUSMAN, OF CHICOPEE, MASSACHUSETTS, ASSIGNOR TO NATIONAL EQUIPMENT COMPANY, OF SPRINGFIELD, MASSACHUSETTS, A CORPORATION OF MASSACHUSETTS.

COATING-MACHINE.

1,160,991.  Specification of Letters Patent.  Patented Nov. 16, 1915.

Application filed December 10, 1913.  Serial No. 805,774.

*To all whom it may concern:*

Be it known that I, ALONZO LINTON BAUSMAN, a citizen of the United States, residing in Chicopee, in the county of Hampden, in the State of Massachusetts, have invented certain new and useful Improvements in Coating-Machines, of which the following is a specification.

This invention relates to a coating machine and more particularly to a chocolate coating machine for providing confectionery centers with a suitable coating of chocolate in the manufacture of chocolate confections. Machines of the same general character have been heretofore in use. The present invention is an improvement over the structure shown in patent to Magniez, #735,890, Aug. 11, 1903.

The object of this invention is to provide an improved arrangement of the elements in a machine of the kind referred to as well as to improve the elements, subcombinations, and combinations advantageous in such a machine.

With these objects in view the invention will be described as shown in one specific embodiment thereof, as shown in the accompanying drawings in which:

Figure 1 shows an end view partly broken away, of the assembled machine. Fig. 2 shows a side view of the machine with the side wall of the casing removed to show the interior. Fig. 3 shows a plan view of the casing and the driving mechanism located in the upper part thereof. Fig. 4 shows a section taken on line 4—4 of Fig. 2. Fig. 5 shows a section taken on line 5—5 of Fig. 2. Fig. 6 shows a section taken on line 6—6 of Fig. 5. Fig. 7 shows a section taken on line 7—7 of Fig. 5.

Referring to Figs. 1 and 3: The main driving shaft $a$ mounted in the casing or frame $v$ has tight and loose pulleys thereon for the driving belt. The shaft $c$ is driven from shaft $a$ by suitable gearing (see Fig. 2). The shaft $e$ is driven from shaft $c$ through a speed changing gear set controlled by the shifting devices $f$ operable by a hand wheel extending from the casing, all as clearly shown in Figs. 2 and 3. The driving shaft $m$ for the agitators (to be described) has a bevel gear connection $n$ to shaft $e$ and extends downwardly to the bottom of the casing. At the lower end (see Fig. 2) the gear 26 is fixed, meshing with gear 27. The gear 27 is mounted on the lower end of the agitator shaft extending through the center of chocolate tank 31. A similar gear 29 and shaft is assembled in connection with tank 30. To both of these shafts the agitators 36, one set in each tank 30 and 31 are fastened (see Fig. 7). The gear 29 is driven from gear 27 by the idler 37 meshing with both gears.

A shaft $q$ (see Fig. 2) extending through the casing is designed to serve as a driving means for two canvas conveyer belts (not shown), one to feed centers to be coated, to the machine, and one to take the coated candies from the machine. This shaft has a bevel gear connection $p$ with a shaft back of shaft $m$ (shown dotted), the upper end of which has a bevel gear connection $o$ with the shaft $e$. Two clutches $r$ and 25 are operated by handles 19 (see Figs. 1 and 2) without the casing to connect or disconnect either one of the canvas belts driven by the shaft $q$.

The wire belt driving shaft $k$ is driven from shaft $m$ by spur gear connection $t$ therewith (see Fig. 2). At the lower end of this shaft $k$, a bevel gear is arranged to drive the sprocket shaft 7 which is mounted in the frame or casing $v$.

The chocolate elevating means 35 arranged vertically in the cylinder 5 is driven by shaft $l$ passing through a stuffing box in the closed end of the cylinder. At the upper end of shaft $l$ is a horizontal friction disk $g^2$ against which bears a friction driving wheel $g'$ feathered to shaft $g$. The latter shaft has a spur gear connection with shaft $a$. The wheel $g'$ is moved toward and from the center of the disk $g^2$ by means of a bracket or arm threaded to rod $i$ and connected to the wheel. By turning the hand wheel 50 located outside of the casing, and thus the rod $i$, the chocolate elevating screw can be regulated to the desired speed very accurately.

The fan 2 mounted above the wire belt 16 (see Figs. 2 and 4) is driven as follows: The shaft $h$ is connected to shaft $g$ by spur gearing and has a friction disk 51 keyed thereto. A similar but reversely arranged disk 52 is keyed to a short shaft alined with shaft $h$, which has fixed to its outer end a pulley $x$ shown in Figs. 1 and 3. The disk 52 is driven by disk 51 through friction wheels (see Fig. 1) rotatably mounted in forks at the ends of stud shafts 53. The friction wheels may bear against the disk 51 near the center thereof and against disk 52 near the circumference thereof or vice-versa and between these points accordingly as the shafts 53 are turned by the worm wheel and segments shown operated by hand wheel 54 from without the casing. The disks 51 and 52 are cupped out for the purpose of receiving the friction wheels. This sort of a frictional speed changing device is wellknown and it is not thought necessary to show it in full detail. The pulley $x$ is belt connected as shown in Fig. 1 to a pulley $y$ (see Fig. 4) extending outside of the casing and keyed to the fan shaft.

It will be noticed from the description so far and an inspection of Fig. 2 that all the driving mechanism and appliances to operate the coating machine are located outside of the casing $v$. The upper wall $v'$ separates the gearing and speed changing devices above the wall from the operable parts below. Only the necessary shafts pass through this wall. This arrangement is important in coating machines in the interests of cleanliness and convenience. By the arrangement shown the main frame or casing $v$ completely incloses the operable parts of the coating apparatus and supports the main driving connections therefor in a separate compartment above and conveniently arranged with relation to the operable parts.

The horizontal wire belt 16 which passes from one end of the casing to a point outside the other end is supported by and travels over shafts 13, 7, 8, 9, 10, and 11, driving wheel 12 and tension guide roller 1 (see Fig. 2). These shafts and guide roller are mounted crosswise in the casing $v$ or in brackets attached thereto. Along one side of belt 16 the driving chains are arranged (see Figs. 2 and 4). One chain passes around sprocket wheels on shafts 7, 8, 9, 14 and 14' as well as suitable guide rollers which are designed to properly tension the chain. This chain is driven from shaft 7 which in turn is driven from shaft $k$ as above described. Shaft 10 is driven from shaft 9 and shaft 11 in turn from shaft 10 by suitable sprockets and chains (see Figs. 2 and 4). The driving wheel 12 has suitable teeth thereon to engage the openings in wire belt and by this means positively drive it. This wheel is driven from shaft 10 by a set of spur gears 17 (see Fig. 4). By manually changing the gears in this set the speed may be varied with respect to the other shafts driven by the chains. The shaft 13 is driven by a chain connection with shaft 14. The shafts over which the wire belt on its upper path travels are driven for the purpose of properly guiding it without friction. The wire belt is tensioned by the roll 1 mounted on the lower end of the bell crank lever pivoted on shaft 13 and turned clockwise by the spring pressed rods $z$ extending to the underside of cover $v'$.

Extending across and above the belt 16 is the shower device 3 which is hung on rods $s$ extending from the undersides of cover $v'$. The lower ends of rods $s$ are threaded into the device 3 and the rods are operatively connected by sprockets and a hand chain $u$ as shown. By moving the hand chain the device 3 may be raised or lowered with respect to belt 16 as desired. The bottom of the shower device is provided with holes 55 throughout and above one half of these holes a semi-circular sieve is provided. The edges at each side in front of the sieve are turned down for a short distance extending over the edge of the belt 16 to provide an overflow for excess chocolate.

The outlet of the fan 2 extends transversely across and immediately above the belt 16 to direct a blast of air against the confections immediately after they receive the coating. This fan is driven, as described above.

A short distance below the belt 16 the casing $v$ is divided by a drip pan or plate 20 which slopes toward two central outlets 21 and 22, the former above the tank 30 and the latter above tank 31. A gate plate 23 pivoted between the outlets may by handle rod 24 (see Figs. 1 and 2) swing to close outlet 22 and open outlet 21, or vice-versa. By this means the chocolate or other coating material being used may be directed into one or the other of the two tanks as desired. These tanks are arranged in the lower part of the casing $v$, as shown in Fig. 5. There is a passage 70 and 71, one leading from each tank to the lower end of the conveyer cylinder 5. Surrounding the lower end of this cylinder is a sleeve valve 90 (see Fig. 6) controlling the passages 70 and 71. A collar 34 at the upper end of the sleeve is engaged by a pin 91 operated by the handle lever 33 mounted on handle 32. The latter embraces the cylinder for support but is loose thereon. A spring normally keeps pin 91 out of engagement with collar 34 until the lever 33 is operated to insert the pin. Thus the handle may be swung into any position without operating the sleeve valve and when it is desired to operate, the valve pin 91 can be inserted at will. It will be seen from Fig. 5 that passages 70 and 71 enter the lower end of the conveyer cylinder as close together as possible. By this arrangement the valve 90 can be turned to close passage 70, open passage 71 or vice-versa, or partly open both passages or close both passages. The passages 80 and 81, one in the bottom of each tank, are controlled by valves 28 to empty the tanks as desired. After the chocolate enters the conveyer cylinder 5 it is elevated and forced through feed cylinder 4 to a discharge point above the screen of the shower device 3.

It is necessary in operating with a coating material such as chocolate to obtain and maintain the chocolate at a desired temperature. The arrangement of my apparatus for this purpose is of particular importance. At the bottom of each tank 30 and 31, a steam coil 95 is provided. The steam enters this coil through suitable valves (see Fig. 5) from the feed pipe 96 and leaves through pipe 97. The bottom wall of each tank is cored out above the steam coils and connects with a jacket space surrounding each tank. Into this space hot water is fed through suitable valves from feed pipe 93. After the water has circulated below and around the tank it passes out from the upper end of each jacket through pipe 98. The conveyer cylinder 5 is jacketed as shown in Fig. 6 for a part of its length and into the bottom of this jacket space, steam and water is fed through the pipe 99. The upper end of the jacket space is connected to pipe 98 by pipe 86 through which the steam and water is exhausted. By this arrangement a constant circulation of a temperature controlling fluid is maintained adjacent to the large bulk of the chocolate.

The operation of my improved machine will now be described to show the objects of the arrangement and construction which has just been described in detail.

The tanks 30 and 31 are filled with chocolate or other coating material of the desired kind and the steam and hot water are turned on through pipes 99 and 93. This heating medium brings the chocolate to a desired temperature and tends to maintain it at that temperature. After the desired temperature is obtained the shaft $a$ is connected with any suitable driving mechanism and the machine begins to operate. The wire belt 19 traverses the entire length of the machine and has candy centers or other material to be coated fed to it by means of a canvas belt, not shown, at a point to the left of the belt seen in Fig. 2. There is a small transverse opening in the casing to allow the canvas belt to enter. The valve 90 is turned by means of the handle 32 to connect one of the tanks 30 or 31 to the conveyer cylinder 5. The elevating mechanism 34 forces the chocolate up through the discharge tube 4 into the shower device 3, the chocolate being screened before it enters the shower device above the perforated bottom. The shower device having been regulated to the proper distance above the wire belt, then begins to shower chocolate over the centers carried by the moving belt 16. The chocolate covers the centers and the excess chocolate drips through the wire belt on to the pan 20 and passes back into one or both of the tanks 30 and 31 according to the position of the valve plate 23. This operation is continued as long as desired, the coated candies being taken off the wire belt at a point to the right shown in Fig. 2 by a canvas belt, not shown, but driven by shaft $q$. Inasmuch as the chocolate is circulated from the tank up through the shower device on to the candies and back to the tank, it is liable to fall below the desired temperature.

In order to have the chocolate which is to cover the confections always the same temperature for the proper coating operation, the two tanks may be manipulated as follows: The chocolate from the tank 30 may be fed to the shower device for a certain period, during which time the drip from the shower device on to the pan 20 may be directed into the tank 31, and since this tank is not having the chocolate fed out from it, the temperature is more certainly maintained than where the chocolate is in more active circulation. After a certain period this arrangement may be reversed and the chocolate fed from the tank 31 to the shower device 3 and the excess chocolate dripping into the pan 20 may be directed into tank 30. By either of these arrangements it will be seen that one tank is kept in reserve, in order to bring the chocolate which has been cooled by the circulation through the shower device up again to the desired temperature before it is circulated again. This arrangement, I believe to be broadly new.

Inasmuch as the several tanks and elevating cylinders have separate heating means, in other words, since each of these units are separately heated, it is much easier to keep the chocolate which is actually being circulated, at the desired temperature and this is of primary importance in a machine of the character described. This arrangement of units also results in a ship-shape arrangement of the entire machine and a more flexible control both for the circulation of the chocolate and of the heating of the chocolate circulated, than is the case in machines prior to my invention. It will be noted that practically all the operable parts of the machine are contained or inclosed by casing $v$. With the two tanks each capable of containing a large volume of chocolate which can be manipulated as described, the machine can be run continuously and without interruption to much better advantage than has heretofore been the case. In machines heretofore in use, where a single tank has been employed the temperature of the chocolate or other coating material frequently falls below the desired temperature and the product of the machine is not entirely satisfactory. It is a well-known fact that the best coating results are obtained when the material is at a certain temperature suitable to the coating used. With my machine the proper temperature of the machine is maintained within the desired limits throughout the entire day's run.

By the arrangement of the two tanks and common elevating means it is also possible to have different qualities of chocolate in the two tanks and thus where a coating of one particular kind is desired for part of a day's run the single tank containing that coating can be connected to allow the circulation of the chocolate through the shower device and as soon as it is desired to change the coating the valve can be manipulated to connect the other tank of the shower device. The circulation of the chocolate in this case is from one tank to the shower device and back to the same tank. Thus various kinds of confections can be passed through the machine without stopping to adapt the machine for the particular kind of confection to be coated. It is also possible to have two distinct kinds of coating material in the machine, that is, chocolate in tank 30 and other coating material in tank 31. Where two kinds of chocolate or two kinds of coating material are used in the machine the circulation will necessarily be through the shower device, one tank, and the elevating means, until it is desired to use the other material. In this case the temperature is more liable to fall below the desired degree, but, inasmuch as an intermittent run of any certain material to be coated will necessarily be short where the machine is arranged to contain two kinds of coating material, the temperature will be maintained by the unit heating means for the desired length of time. The more ordinary use of the machine will be to operate on one kind of confection for a long period and in this case the arrangement described will insure coating material at exactly the right temperature passing through the shower device at all times.

While my invention has been described in the specific form shown for the purposes of illustration it is clear that it can be embodied in various forms with the same or equivalent advantages.

What I claim is:—

1. A coating machine, comprising in combination, a conveyer mechanism to carry confections to be coated, means to flood the confections on the conveyer with liquid coating material, two or more warming containers for the coating material, together with mechanism to cause a circulation of the coating material from one or the other of said containers to said flooding means.

2. A coating machine, comprising in combination, a conveyer mechanism to carry confections to be coated, means to flood the confections on the conveyer with liquid coating material, two or more warming containers for the coating material, mechanism to cause the circulation of the coating material from one container to said flooding means and back to another container.

3. A coating machine, comprising in combination, a conveyer mechanism to carry confections to be coated, means to flood the confections on the conveyer with liquid coating material, two or more warming containers for the coating material together with mechanism to cause the circulation of the coating material from one of said containers to said flooding means and back to said containers.

4. A coating machine, comprising in combination, a conveyer mechanism to carry confections to be coated, means to flood the confection on the conveyer with liquid coating material, two or more warming containers for the coating material, together with mechanism to cause the circulation of the coating material from either container to said flooding means and back to the same container.

5. A coating machine, comprising in combination, a conveyer mechanism to carry confections to be coated, means to flood the confections on the conveyer with liquid coating material, two or more warming containers for the coating material, together with mechanism to cause a circulation of the coating material from all of said containers to said flooding means and back to said containers.

6. A coating machine, comprising in combination, a substantially closed casing, a conveyer mechanism to carry confections to be coated mounted to traverse said casing, means located above the conveyer to flood the confections thereon with liquid coating material, two or more warming tanks for the coating material located under the conveyer, a force-feed conveyer in said connection adapted to connect said tanks with the flooding means having suitable valves to connect with either or both tanks, a drip tank located under the conveyer having an outlet with a valve therein to direct the coating material dripping from the conveyer to either one of the tanks.

7. A coating machine, comprising in combination, a substantially closed casing, a conveyer mechanism to carry confections mounted to traverse said casing, a flooding device located above the conveyer, two warming containers located beneath the conveyer each having rotatable agitators therein, a force-feed conveyer to the flooding device connected with both of said tanks, a valve arranged in said conveyer to shut off the connection to one or both of said tanks, a drip pan located below the conveyer and above the tanks arranged to receive the coating material passing through the conveyer and means at the outlet of said drip pan to direct said material to one or both of the tanks, driving and speed changing devices located on the upper wall of said casing having driving connections therefrom passing into the casing and operable to drive the conveyer, the agitators, and the force-feed conveyer.

ALONZO LINTON BAUSMAN.

Witnesses:
F. G. NEAL,
H. E. HARTWELL.

Copies of this patent may be obtained for five cents each, by addressing the "Commissioner of Patents, Washington, D. C."